Figure 1:
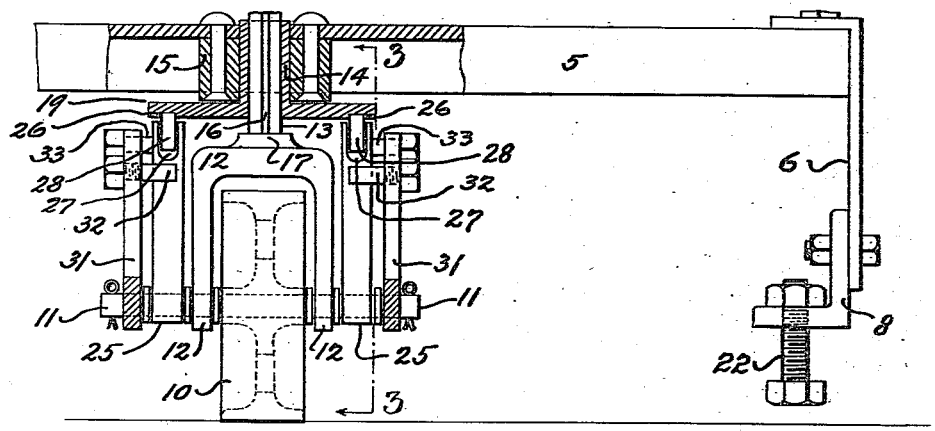

W. E. BOEHCK.
TRUCK.
APPLICATION FILED SEPT. 2, 1914.

1,192,981.

Patented Aug. 1, 1916.

WITNESSES:
Fred Roeger
Om H Gee

INVENTOR
William Edward Boehck
BY
H. C. Karlson
ATTORNEY

UNITED STATES PATENT OFFICE.

WILLIAM EDWARD BOEHCK, OF JERSEY CITY, NEW JERSEY, ASSIGNOR TO NEW YORK REVOLVING PORTABLE ELEVATOR COMPANY, OF JERSEY CITY, NEW JERSEY, A CORPORATION OF NEW JERSEY.

TRUCK.

1,192,981.  Specification of Letters Patent.  Patented Aug. 1, 1916.

Application filed September 2, 1914. Serial No. 859,818.

*To all whom it may concern:*

Be it known that I, WILLIAM EDWARD BOEHCK, a citizen of Germany, and resident of Greenville, Jersey City, in the county of Hudson and State of New Jersey, have invented certain new and useful Improvements in Trucks, of which the following is a specification.

The invention herein disclosed relates to the operation of wheeled vehicles, and it consists of improved means enabling the vehicle equipped therewith to be readily changed from a shiftable posture to a fixed condition of rest, or the reverse.

One object of the invention is to provide for quick, easy, and safe transition from either the movable or the stationary disposition of vehicle aforesaid to the contrary state, as may be required for its convenient working.

Another object is the production of a simple and effective mechanism whereby the vehicle may be raised or lowered relatively to its supporting wheel or wheels, and further will permit the latter to remain movable independently of the said mechanism.

Still another object is so to arrange the parts of this mechanism that it may be operated at any angular position of the leading wheel of the vehicle.

Other objects and advantages of the invention will become obvious to the reader upon perusing the following detailed statement relative to one of the many forms in which this invention may be embodied.

The drawing hereto annexed illustrates what is now considered the most practical one of the said forms of the invention, and the present descriptive matter will be restricted thereto in order to avoid prolixity and confusion, though several other forms are contemplated which promise to be equally effective.

Figure 2:
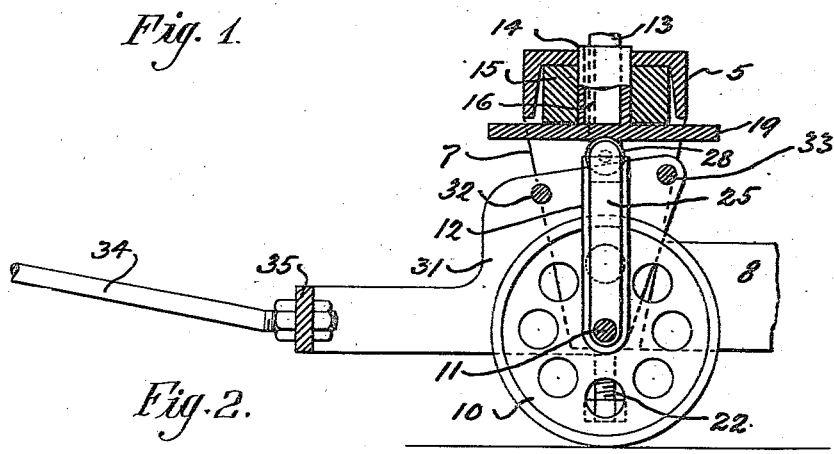
Figure 3:
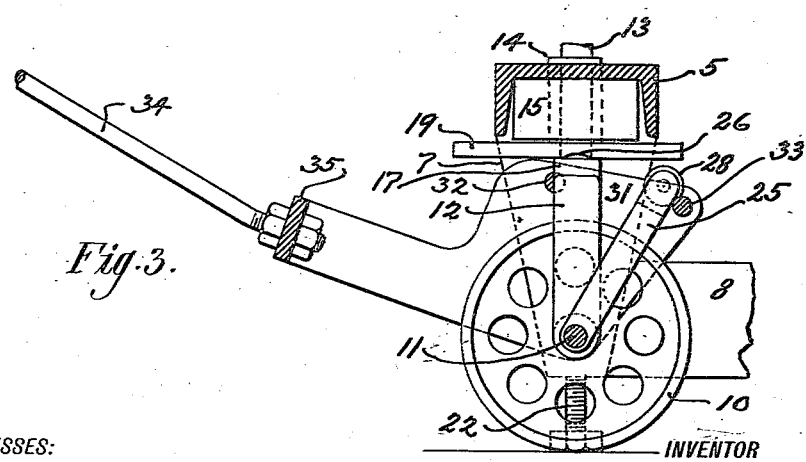

Referring particularly, therefore, to the said drawing, Figure 1 is a fragmentary front view, partly in section, showing one of the preferred embodiments of the invention connected with the fore part of a wheeled vehicle. Fig. 2 is a central vertical section of the same, with the leading wheel of the vehicle in side elevation; and Fig. 3 is a section on the line 3—3 of Fig. 1, looking in the direction pointed out by the arrows.

In the form of the invention represented by the said figures, the numeral "5" denotes the forward member of a truck bed or frame as may be used for instance in conjunction with a portable elevator or hoist. This truck frame has lateral pendants 6, 7, side pieces, as 8, and other co-related parts known in this art.

The truck bed or frame herein shown will be mounted, ordinarily, on a plurality of wheels, and hence the foregoing reference to a leading wheel, the use of which is implied, with other bearing wheels, in a truck of this type. However, the present invention may in certain instances be operated with a single wheel, and consequently only one has been shown, the same being designated by the reference numeral 10 in the accompanying drawing.

It is intended that the wheel 10 should move, as may be required, at various angles with relation to the truck member 5, and for this reason the former is connected with the latter by means of a swivel connection, preferably including an axle 11 projecting from both sides of the wheel, a fork 12 with downwardly directed members in which this axle is journaled, and a stem 13 rising centrally from the fork in position to engage the truck member. By preference also, the stem 13 is slidably fitted in a sleeve 14, designed to rotate in a bearing 15, of the latter-named member. The stem is splined within the sleeve, as indicated at 16, to adapt it for rotation therewith, though retaining its independent axial movement. Due to this movement, the truck member is enabled to be raised and lowered relatively to the wheel.

As shown on the drawing, the rotatable sleeve 14 may be formed or provided with a base plate or flange 19, extending outwardly therefrom over and beyond the fork 12 of the wheel 10. This plate, when the sleeve thereof is in its uppermost position on the splined stem, as represented in Figs. 1 and 2, affords an intermediate piece transmitting the weight of the truck to the wheel and related parts positioned beneath, or a portion of the weight, according to the species of wheeled vehicle used, as will be understood.

Coacting with the swiveled wheel aforedescribed, and the mounting thereof, is an under support designed to take up the weight of the truck or truck member, as the case may be, whenever it is desired to relieve the wheel of the weight, and render the same inoperative either as a leading or bearing element. Two such supports may be conveniently employed, one at each end of the truck member 5. In the form of the invention illustrated herein, each one of these supports consists simply of a set-screw 22, vertically adjustable in the side member 8 toward or away from the surface of the ground or floor where the truck is stationed. When this set-screw or bolt has been brought into contact with the said surface, as outlined in Fig. 3, the truck member 5 is then in its lowermost position. In that case, the bearing block 15 brings down the plate 19 with the sleeve 14 sliding along the spline of the stem 13, upon a hub 17 on top of the wheel-fork 12. The wheel, nevertheless, is left free to turn at the desired angle, with its said fork.

One or more lifters may be provided to raise the truck member 5 from the mounting of the wheel 10, in order to shift the weight of the former from the ground or floor under the supports 22, to the wheel and its resting surface, and such lifters may be of various forms and applied in different ways. As shown in the several views of the annexed drawing, two lifters are preferably employed, each consisting of a lever 25, fulcrumed at one end upon the axle 11 of the wheel 10, and adapted at its other end to engage the under surface of the plate 19. The use of this intermediate plate is favored, to avoid direct contact of the lifting end of the lever with the truck member, and further to afford a suitable dwelling place wherein this end of the lever may lodge when set up in a vertical position. The dwelling place here referred to may consist of a cavity or recess 26, formed in the under side of the plate 19, near one edge thereof, and disposed so as to receive the lever end, which also may be bifurcated, as at 27, and made to carry an antifriction roller 28. As the plate 19 is rotated together with the sleeve 14 and stem 13 splined therein, it turns coincidently with the fork 12, axle 11, and wheel 10, when the latter is veering, so that the lever 25 carried by the axle and the plate 19 having the recess 26 thereabove will always be in position to register, irrespective of the angle of the wheel relatively to the truck member.

The fulcrum of the aforesaid lever 25, on the axle 11, may consist of a pivoted connection, as shown, and preferably the lever is mounted so it can be swung in a vertical plane, along an arc to which the plate is tangent. A co-axially swinging member 31 is mounted upon the axle 11, by the side of the pivotally mounted lever 25 thereon, and the former is provided with studs or engagement devices 32, 33, between which the latter may be oscillated. A handle 34. of any approved shape, serves to swing the member 31. This handle is conveniently fastened to a cross-bar 35 joining the pair of swinging members 31. In the construction exemplified, it is deemed expedient to have two lifting levers 25, one on each side of the wheel and its mounting, with studs or other engaging means intermediate of the said members.

It will be noticed that the upper end of the spindle 13 is shown as being broken off; it is understood however, that the same may be prolonged to serve as an attachment for an impact absorber, such as a rubber-bumper or a dash pot of any approved type, to cushion the contact between the truck member 5 and the plate 19 when the latter named elements are brought rapidly together incidental to the truck being lowered.

In the operation of this improved device, it is merely necessary to swing the handle 34 up or down to bring about the engagement or disengagement of the levers 25 with the plate 19, and accordingly raise or lower the truck bed or frame. The studs 32, 33, it will be observed, act alternately as dogs or stops for the levers. Thus, the levers may be set in a vertical position represented in Fig. 2, by moving the handle 34 either upward or downward, each stud 32 or 33 being capable of forcing the levers vertically under the plate 19. The handle then retains a certain amount of idle movement corresponding to the distance between either of the said studs and the levers standing therebetween. When one set of studs either front or back, is forced against the levers, to dislodge the rollers 28 from the cavities 26, the truck member 5 is first raised a certain amount and then lowered whereafter the levers are free to fall against the other set of studs, one side of which is indicated by 33, in Fig. 3.

Having described my invention, what I desire to secure by Letters Patent and claim is:—

1. The combination of a wheel, a truck vertically movable relatively to the same, a lifter operable to raise the truck from the wheel, a member to actuate said lifter, and means on opposite sides of said member serving to control the lifter and limit its motion.

2. The combination of a truck, a wheel thereunder, a lever operable to raise the truck from the wheel, an actuating member for said lever, and devices on said member acting alternately to move and arrest said lever.

3. The combination of a wheel, a truck vertically movable thereupon, a member connected with the wheel axle, and a loosely mounted element controlled by said member to raise the truck from the wheel.

4. The combination of a wheel, a truck vertically movable with relation to the same, an interposed member, a lifter operable to raise the truck from the wheel, and a retainer with said member engageable by said lifter.

Signed at Greenville, Jersey City, in the county of Hudson and State of New Jersey this 27th day of August A. D. 1914.

WILLIAM EDWARD BOEHCK.

Witnesses:
   H. C. KARLSON,
   W. C. COLLINS.